May 20, 1958 R. T. WALSH 2,835,218
REMOTE ANGULAR POSITION INDICATOR
Filed April 24, 1957

INVENTOR
RICHARD T. WALSH
ATTORNEY

United States Patent Office 2,835,218
Patented May 20, 1958

2,835,218

REMOTE ANGULAR POSITION INDICATOR

Richard T. Walsh, Glastonbury, Conn.

Application April 24, 1957, Serial No. 654,780

2 Claims. (Cl. 116—31)

This invention relates to indicating devices particularly for the angular position of automobile steering wheels or other angularly adjusted members at a distance from the position of the operator.

A primary object of the invention is to provide on the operating end of an obliquely disposed steering wheel post a device to indicate the angular position of the steering wheels of a vehicle such as an automobile or the position of an angularly adjustable member.

A feature of importance of the invention when applied to an automobile is that a circular member or housing is inserted within a recess formed in the center of the steering wheel having a member therein moved rotatably by rotation of the steering wheel, there being an indicating line or markings on the upper face of the movable member which is moved angularly in accordance with angular movements of the steering wheel and wheels.

Another object of importance of the invention is that the movable member within the indicator housing is provided with internal gear teeth adjacent its periphery meshing with the teeth of a pinion fixed in the center of the housing, the movable member being constantly forced toward its lowermost position by the force of gravity.

Another feature of importance of the invention is that the movable member within the housing is of appreciable weight so that it will normally hang down from the pinion due to its weight and the obliquity of the steering post.

And finally, a feature of the invention is that the movable member within the housing is maintained with its teeth meshing with the pinion by means of an annular groove within which the pinion can move freely with its teeth meshing with the internal teeth of the movable member.

With the above and other objects in view, the invention may include the features of construction and operation set forth in the following specification and illustrated in the accompanying drawings.

In the accompanying drawings annexed hereto and forming a part of this specification, I have shown the invention embodied in an indicating device mounted within a recess formed within the center of the obliquely disposed steering wheel but it will be understood that the invention can be otherwise embodied and that the drawing is not to be construed as defining or limiting the scope of the invention, the claims appended to this specification being relied upon for that purpose.

In the above mentioned drawing, there has been shown but one embodiment of the invention which is now deemed preferable, but it is to be understood that changes and modifications may be made within the scope of the appended claims without departing from the spirit of the invention.

Briefly, and in its broadest aspect, the invention may include the following principal parts: First, a housing of circular form providing a relatively large circular recess which may be provided with a transparent cover permanently secured about its rim to the housing; second, a central pinion positioned in fixed position to the housing and extending within the recess; third, a movable member within the recess which may swing about the central pinion within the recess having internal gear teeth adjacent its periphery meshing with the gear teeth on the pinion; and fourth, an indicating line or indicia marking on the outer face of the movable member.

Figure 1:
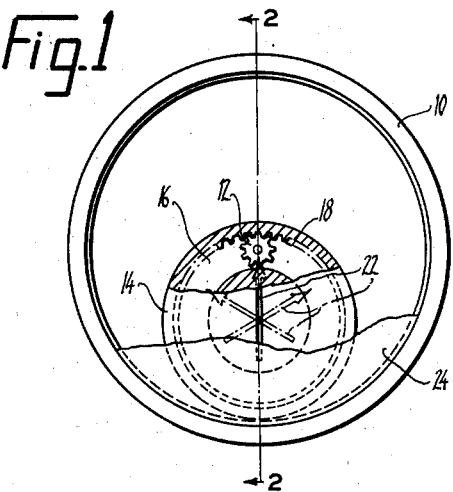
Fig. 1 is a front view of a wheel position indicator made according to the present invention, parts being partially broken away to more clearly show the construction.
Figure 2:
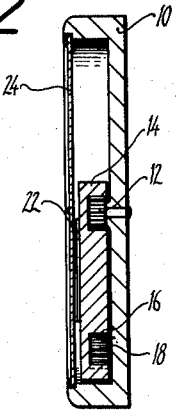
Fig. 2 is a central sectional view of the indicator taken along lines 2—2 of Fig. 1.
Figure 3:
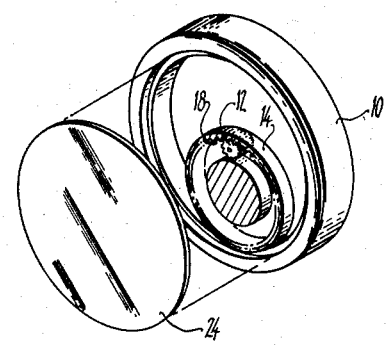
Fig. 3 is an isometric view of the indicator shown in Figs. 1 and 2.

Referring more in detail to the figures of the drawing and first to Figures 1, 2 and 3, it will be seen that the device is in the form of a circular recessed member 10. Centrally mounted within this recess of this member is a pinion 12 having a small number of gear teeth. Preferably this pinion or gear may be provided with an axially extending stem by means of which it is secured in fixed position centrally within the recess of housing 10.

Movably mounted within the recess of member 10 is a disk-like member 14 having an annular concentric groove 16 adjacent its periphery, the outer wall of which is provided with internal gear teeth 18 meshing with the teeth of the pinion 12. To maintain the gear teeth 18 in mesh with the teeth on pinion 12 the movable member 14 is provided with the annular groove adjacent its periphery and concentric with the periphery. This groove 16 is sufficiently wide and deep enough to freely accommodate the pinion 12 with its teeth in mesh with the teeth 18 of the internal gear. The central portion of the movable member 14 is of full depth of the member to give the member as much weight as possible.

The recess within the housing 10 is of sufficient diameter to permit the movable member 14 to move completely about therein. On the outer or front face of the movable member 14 is an arrow or other form of direction indicating mark 22. A glass or transparent cover 24 is fitted over the open front face of the housing 10.

Figure 4:
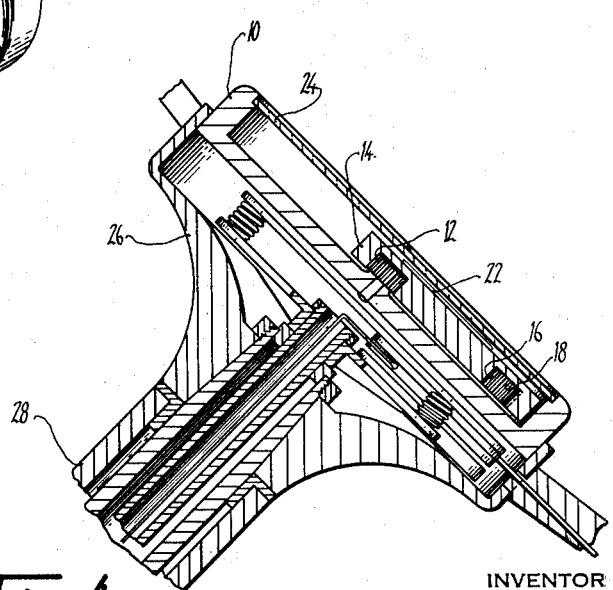
Fig. 4 is a central sectional view taken through the steering post and wheel showing a mounting for the direction indicator.

As shown in Fig. 4 the housing 10 sets firmly within a central recess formed in the upper portion of the steering wheel 26 so that turning of the steering wheel serves to rotate the housing 10 and pinion 12. As the wheel 26 and its post 28 extend obliquely upward and the movable member 14 is free to move about within the recess in the housing 10 while the pinion engages the internal gear teeth formed on the outer wall of the groove 16, its position will always be with its major portion below the pinion 12. By properly proportioning the size and number of teeth on the pinion 12 and the number of internal teeth 18 in the groove 16 in the movable member 14 the angular movement of the direction indicating line 22 on the movable member 14 will approximate the angular disposition of the wheels positioned by rotation of the steering wheel 26.

I claim as my invention:

1. A position indicator for angularly adjustable members, comprising a housing adapted for mounting on the operating end of an obliquely disposed steering member for rotation with angular movements of the member, a pinion mounted in fixed position centrally of said housing, and a member freely movable about within said housing and having internal gear teeth adjacent its periphery maintained in meshing relation with said pinion, whereby the body portion thereof will remain below said pinion in any position of the steering wheel while being rotated by engagement with the pinion, and direction indicia on said movable member.

2. A position indicator for angularly adjustable members, comprising a housing adapted for mounting on the operating end of an obliquely disposed steering member for rotation with angular movements of the member, a pinion mounted in fixed position centrally of said housing, a member freely movable within said housing having an annular concentric groove formed therein internal gear teeth formed in the outer wall of said groove, and indicating indicia on said movable member, whereby angular movement of said wheel will correspondingly angularly move said movable member about said pinion.

References Cited in the file of this patent
UNITED STATES PATENTS 2,169,861     Walsh _____ Aug. 15, 1939